United States Patent
Boban et al.

(10) Patent No.: US 9,825,880 B2
(45) Date of Patent: Nov. 21, 2017

(54) METHOD AND SYSTEM FOR CONTROLLING MESSAGES BETWEEN COMMUNICATING ENTITIES

(71) Applicant: NEC Europe Ltd., Heidelberg (DE)

(72) Inventors: Mate Boban, Heidelberg (DE); Pablo Pavón Mariño, Cartagena (ES); Esteban Egea López, Cartagena (ES)

(73) Assignee: NEC CORPORATION, Tokyo (JP)

( * ) Notice: Subject to any disclaimer, the term of this patent is extended or adjusted under 35 U.S.C. 154(b) by 68 days.

(21) Appl. No.: 14/790,140

(22) Filed: Jul. 2, 2015

(65) Prior Publication Data

US 2016/0006670 A1    Jan. 7, 2016

(30) Foreign Application Priority Data

Jul. 2, 2014   (EP) ..................................... 14175347

(51) Int. Cl.
| | |
|---|---|
| *H04L 12/911* | (2013.01) |
| *H04L 12/825* | (2013.01) |
| *H04L 12/729* | (2013.01) |
| *H04W 28/22* | (2009.01) |

(52) U.S. Cl.
CPC .......... *H04L 47/822* (2013.01); *H04L 45/125* (2013.01); *H04L 47/25* (2013.01); *H04L 47/824* (2013.01); *H04W 28/22* (2013.01)

(58) Field of Classification Search
CPC ... H04L 47/822; H04L 45/125; H04L 47/824; H04L 47/25
See application file for complete search history.

(56) References Cited

U.S. PATENT DOCUMENTS

| | | | |
|---|---|---|---|
| 2003/0028440 A1* | 2/2003 | Allen ................. | G06Q 30/0206 705/7.35 |
| 2003/0097461 A1* | 5/2003 | Barham .................. | H04L 29/06 709/235 |
| 2005/0003824 A1* | 1/2005 | Siris ........................ | H04L 47/10 455/452.1 |
| 2008/0130615 A1* | 6/2008 | Kashiwagi ............ | H04L 5/0007 370/343 |
| 2008/0137537 A1* | 6/2008 | Al-Manthari ..... | H04W 72/1257 370/238 |

(Continued)

*Primary Examiner* — Charles C Jiang
*Assistant Examiner* — Thad Defauw
(74) *Attorney, Agent, or Firm* — Leydig, Voit & Mayer, Ltd.

(57) ABSTRACT

A method for controlling messages between communicating entities (CE) having computing devices, each CE sending messages to other neighboring CE with a entity-dependent message rate (CEMR), and with an entity-dependent transmission power, the messages being transmitted via one or more channels having a maximum channel capacity, and the CEMR defining a rate interval between a minimum and maximum rate, includes determining the CEMR within the rate interval by: (a) using a utility function for each CE; b) assigning an initial price for each CE; (c) adjusting the CEMR of each CE accounting for received prices of other CE; (d) computing a new price for each CE based on difference between initial price and available channel load for respective CEs; and (e) checking a termination condition for the difference and if unfulfilled, use the new price as initial price and repeat (c)-(e) until a termination condition is fulfilled.

15 Claims, 3 Drawing Sheets

(56) References Cited

U.S. PATENT DOCUMENTS

| | | | | |
|---|---|---|---|---|
| 2008/0313101 | A1* | 12/2008 | Helander | G06Q 30/02 705/400 |
| 2010/0135170 | A1* | 6/2010 | Fan | H04W 28/16 370/252 |
| 2010/0248763 | A1* | 9/2010 | Aaron | H04W 28/22 455/509 |
| 2011/0307609 | A1* | 12/2011 | Rangarajan | H04W 72/1252 709/225 |
| 2012/0259950 | A1* | 10/2012 | Havekes | H04L 65/4084 709/217 |
| 2015/0002292 | A1* | 1/2015 | Cavalcanti | G08B 21/0211 340/539.12 |

\* cited by examiner

METHOD AND SYSTEM FOR CONTROLLING MESSAGES BETWEEN COMMUNICATING ENTITIES

CROSS-REFERENCE TO RELATED APPLICATIONS

Priority is claimed to European Patent Application No. 14 175 347.5, filed on Jul. 2, 2014, the entire disclosure of which is hereby incorporated by reference herein.

FIELD

The present invention relates to a method for controlling messages between communicating entities, a system for this controlling, and a communicating entity.

BACKGROUND

Cooperative inter-vehicular applications usually rely on the exchange of broadcast hop status messages among vehicles which provide detailed information about vehicle speed, position, heading, acceleration or the like. These messages are called beacons and are transmitted for example periodically at a fixed or variable beaconing rate.

One of the problems is, that the aggregated load on the transmission channel, for example wireless channel, due to periodic beacons can rise to a point where it can limit or prevent the transmission of other types of messages. This is called channel congestion due to beaconing activity.

Various control schemes have been proposed to prevent this situation, i.e. channel congestion. A control scheme may for example decrease the beaconing rates or decrease the transmit power, thus reducing the number of vehicles in transmission range of each other or a combination of both of them as disclosed in the non-patent literature of M. Sepulcre, J. Mittag, P. Santi, H. Hartenstein, and J. Gozalvez, "Congestion and Awareness Control in Cooperative Vehicular Systems", Proceedings of the IEEE, vol. 99, no. 7, pp. 1260-1279, 2011.

For a practical implementation, so-called decentralized schemes have been proposed where no centralized infrastructure is needed for controlling the messages. One of the further beaconing rate control schemes is for example disclosed in the non-patent literature of J. B. Kenney, G. Bansal and C. E. Rohrs, "LIMERIC: A Linear Adaptive Message Rate Algorithm for DSRC Congestion Control," IEEE Transactions on Vehicular Technology, vol. 62, no 9, pp. 4182-4197, 2013, T. Tielert, D. Jiang, Q. Chen, L. Delgrossi and H. Hartenstein, "Design Methodology and Evaluation of Rate Adaptation Based Congestion Control for Vehicle Safety Communications," Vehicular Networking Conference (VNC), 2011 IEEE, pp. 116-123, 2011, Y. P. Fallah, C. L. Huang, R. Sengupta and H. Krishnan, "Analysis of Information Dissemination in Vehicular Ad-Hoc Networks With Application to Cooperative Vehicle Safety Systems," IEEE Transactions on Vehicular Technology, vol. 60, no 1, pp. 233-247, 2011 and C.-ling Huang, Y. P. Fallah, R. Sengupta, and H. Krishnan, "Adaptive Intervehicle Communication Control for Cooperative Safety Systems," IEEE Network, vol. 24, pp. 6-13, 2010.

Although most of them are able to bring the channel load to a desired level, none of them is able to meet global fairness, wherein no vehicle should be allocated arbitrarily less resources than its neighbors under the constraints imposed by the available capacity. In particular most of them provide a very basic notion of fairness and how beaconing rates are allocated.

A further problem is that global fairness among the vehicles is not achieved in multi-hop scenarios where not all vehicles are in the range of each other or a remarkable overhead is introduced in order to meet only an approximate fairness goal. The lower layers of communication stack are very similar in both American and European specifications; in both of them, IEEE 802.11p provides a CSMA-based medium access control MAC and supports frame class priority by enhanced distributed channel access mechanism EDCA. Most of the transmissions are broadcast in nature and use a fixed contention window and no acknowledgement or retransmission. ETSI defines a 10 MHz control channel for vehicular communications at 5.9 GHz as disclosed in the non-patent literature of ETSI EN 302 663, "Intelligent Transport Systems (ITS); Access layer specification for Intelligent Transport Systems operating in the 5 GHz frequency band", V0.1.3, 2012. Periodic beaconing over one-hop broadcast communications supports cooperative inter-vehicular applications by disseminating status and environmental information to vehicles on the control channel what has been called cooperative awareness service as disclosed in the non-patent literature of ETSI TS 102 637-2, "Intelligent Transportation Systems ITC); Vehicular Communications; Basic Set of Applications; Part 2: Specification of Cooperative Awareness Basic Service", 2010.

The above mentioned decentralized congestion control has also been published by ETSI in the non-patent literature of ETSI TS 102 687 "Intelligent Transport Systems (ITS); Decentralized Congestion Control Mechanism for Intelligent Transport Systems operating in the 5 GHz range; Access Layer part", 2011, which can accommodate a variety of controls such as transmit power, message rate or receiver sensitivity. The rate of beacons has an influence on the quality of service of the applications. Since safety-related applications usually need the maximum beaconing rate of 10 beacons/s as disclosed in the non-patent literature of ETSI TS 102 637-2, "Intelligent Transportation Systems ITC); Vehicular Communications; Basic Set of Applications; Part 2: Specification of Cooperative Awareness Basic Service", 2010, it is expected to be the default one. In a high-density traffic scenario, more than a hundred vehicles may be in range even for moderate transmission ranges, therefore the problem of channel congestion due to beaconing activity has to be taken into account.

Transmit power control (TPC) has been proposed as a mechanism for congestion control by both ETSI standards as disclosed in the non-patent literature of ETSI TS 102 687 "Intelligent Transport Systems (ITS); Decentralized Congestion Control Mechanism for Intelligent Transport Systems operating in the 5 GHz range; Access Layer part", 2011, and recently in the non-patent literature of M. Sepulcre, J. Mittag, P. Santi, H. Hartenstein, and J. Gozalvez, "Congestion and Awareness Control in Cooperative Vehicular Systems", Proceedings of the IEEE, vol. 99, no. 7, pp. 1260-1279, 2011, and E. Egea-Lopez, J. J. Alcaraz, J. Vales-Alonso, A. Festag and J. Garcia-Haro, "Statistical Beaconing Congestion Control for Vehicular Networks", IEEE Transactions on Vehicular Technology, vol. 62, no. 9, pp. 4162-4181, 2013.

However, TPC is prone to instabilities and its accuracy relies on the quality of the propagation estimation. Joint transmit power and rate control may be an option, especially to enforce particular application quality of service requirements, as disclosed in the non-patent literature of M. Sepulcre, J. Mittag, P. Santi, H. Hartenstein, and J. Gozalvez, "Congestion and Awareness Control in Cooperative Vehicular Systems", Proceedings of the IEEE, vol. 99, no. 7, pp. 1260-1279, 2011, Y. P. Fallah, C. L. Huang, R. Sengupta and H. Krishnan, "Analysis of Information Dissemination in Vehicular Ad-Hoc Networks With Application to Cooperative Vehicle Safety Systems," IEEE Transactions on Vehicular Technology, vol. 60, no 1, pp. 233-247, 2011 and C.-ling Huang, Y. P. Fallah, R. Sengupta, and H. Krishnan, "Adaptive Intervehicle Communication Control for Cooperative Safety Systems," IEEE Network, vol. 24, pp. 6-13, 2010.

Regarding generic beaconing rate control proposals, conventional methods as disclosed in the non-patent literature of J. B. Kenney, G. Bansal and C. E. Rohrs, "LIMERIC: A Linear Adaptive Message Rate Algorithm for DSRC Congestion Control," IEEE Transactions on Vehicular Technology, vol. 62, no 9, pp. 4182-4197, 2013, and T. Tielert, D. Jiang, Q. Chen, L. Delgrossi and H. Hartenstein, "Design Methodology and Evaluation of Rate Adaptation Based Congestion Control for Vehicle Safety Communications," Vehicular Networking Conference (VNC), 2011 IEEE, pp. 116-123, 2011 propose transmission rate control algorithms to comply with a global generic beaconing rate goal. The former, called LIMERIC, uses a linear control based on continuous feedback (beaconing rate in use) from the local neighbors, whereas the latter, called PULSAR, uses additive increase multiplicative decrease (AIMD) with binary feedback (congested or not) from one and two-hop neighbors. Both of them, however, show several limitations. Regarding fairness, LIMERIC aims at proportional fairness whereas PULSAR at max-min fairness, but none of them define it formally.

LIMERIC is shown to converge to a single fixed point, that is, a unique rate for every vehicle, which is below the optimal proportional fairness rate by design. In fact, there is a trade-off between the convergence speed and the distance to the optimal value. A problem is the fact that the convergence is only guaranteed when all the vehicles are in range, which is clearly unrealistic.

Regarding PULSAR, it is not clear that the usual assumptions used with AIMD in other contexts, such as wired networks or end-to-end congestion, hold in a vehicular scenario, as in particular, the assumption that all users see the same congestion feedback. In addition, a number of modifications to the basic AIMD are described without showing how it may affect fairness. Finally, it requires synchronized updates and piggybacking of two-hop neighbor congestion information.

In the non-patent literature of B. Kim, I. Kang, H. Kim, "Resolving the Unfairness of Distributed Rate Control in the IEEE WAVE Safety Messaging," IEEE Transactions on Vehicular Technology, to appear, online early access available, 2014 it is shown that both of them actually may fall into unfair configurations and a solution is proposed to compare the target rate with the average rate of the neighbors before applying an AIMD control. However, this only ensures that two neighbor vehicles cannot diverge in their settings but do not ensure correct convergence to a fair configuration in a realistic scenario.

Therefore for a practical implementation a control method should be fair and decentralized: First, vehicles should control their neighbor vehicles and without relying on any centralized infrastructure. Besides, to reduce the signal overhead, the exchanged information should be kept to a minimum. Fairness must be guaranteed as a safety requirement since beacons are used to provide vehicles with an accurate estimate of the state of their neighbors. In general, the higher the beaconing rate, the higher the quality of the state information as disclosed in M. Sepulcre, J. Mittag, P. Santi, H. Hartenstein, and J. Gozalvez, "Congestion and Awareness Control in Cooperative Vehicular Systems," Proceedings of the IEEE, vol. 99, no. 7, pp. 1260-1279, 2011. Consequently, no vehicle should be allocated arbitrarily less resources than its neighbors, under the constraints imposed by the available capacity. Moreover, global fairness should be achieved, that is, not only among neighboring vehicles but among all vehicles contributing to congestion. Finally, the control should also provide quick and effective adaption to changes in the environment, such as the channel conditions and the number of vehicles in range. The limits on such capabilities are captured by the convergence properties of the algorithm in use. Several beaconing rate control schemes have been proposed in the non-patent literature:

J. B. Kenney, G. Bansal and C. E. Rohrs, "LIMERIC: A Linear Adaptive Message Rate Algorithm for DSRC Congestion Control," IEEE Transactions on Vehicular Technology, vol. 62, no. 9, pp. 4182-4197, 2013

T. Tielert, D. Jiang, Q. Chen, L. Delgrossi and H. Hartenstein, "Design Methodology and Evaluation of Rate Adaption Based Congestion Control for Vehicle Safety Communications," Vehicular Networking Conference (VNC), 2011 IEEE, pp. 116-123, 2011

Y. P. Fallah, C. L. Huang, R. Sengupta and H. Krishnan, "Analysis of Information Dissemination in Vehicular Safety Systems," IEEE Transaction on Vehicular Technology, vol. 60, no. 1, pp. 233-247, 2011

C.-ling Huang, Y. P. Fallah, R. Sengupta, and H. Krishnan, "Adaptive Intervehicle Communication Control for Cooperative Safety Systems," IEEE Network, vol. 24, pp. 6-13, 2010.

Although most of them are able to bring the channel load to the desired level, none of them is able to meet all the aforementioned requirements. In particular, most of them provide only a very basic notion of fairness in how beaconing rates are allocated, e.g. without a formal definition and rigorous convergence support. Moreover, either global fairness is not achieved in multi-hop scenarios, when not all vehicles are in range of each other, or a remarkable overhead is introduced in order to meet only an approximate goal. As we shall show in the following sections, when faced with non-trivial (realistic) arrangements of vehicles, they converge to clearly unfair beaconing rate allocations.

SUMMARY

An aspect of the invention provides method for controlling messages between communicating entities, the communicating entities (CE), including computing devices, the method being performed in a memory available to a computing device; each CE sending messages to other neighboring CE with a communicating entity-dependent message rate (CEMR), and with an communicating entity-dependent transmission power; the messages being transmitted via one or more channels having a maximum channel capacity; and the CEMR defining a rate interval between a minimum and maximum rate, the method comprising: determining the CEMR within the rate interval by employing a combination of two or more of the following: a) using a utility function for each CE being at least dependent on the CEMR and at least one parameter including a fairness parameter; b) assigning an initial price for each CE, wherein the price is calculated as a difference between the maximum channel capacity and the number of messages received per time unit;

c) adjusting the CEMR of each CE taking into account received prices of the other CE, wherein each CE adjusts its own CEMR, such that the difference between the own utility function for the CEMR and the sum of received prices weighted with the own rate is maximized; d) computing a new price for each CE based on difference between the initial price and available channel load for the respective CE; and e) checking a termination condition for the difference and if not fulfilled, use the new price as initial price and perform steps c)-e) again until the termination condition is fulfilled.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Although applicable to any kind of communicating entity the present invention will be described with regard to vehicles as communicating entities. Although applicable to messages in general the present invention will be described with regard to messages of cooperative inter-vehicular applications Embodiments of the invention therefore address the above-mentioned problems of providing a realistic controlling of messages avoiding channel congestion while being easy to implement, which require less environmental information than conventional methods and provide fairness in beacon rate allocation throughout the communicating entities.

In an embodiment the present invention provides a method for controlling messages between communicating entities, 'CE', said CE comprising computing devices, wherein said method is performed in a memory available to a computing device, and wherein each CE sends messages to other neighboring CE with an entity-dependent message rate, 'CEMR', and with an entity-dependent transmission power, and wherein said messages are transmitted via one or more channels having a maximum channel capacity, and wherein the CEMR are between a minimum and maximum rate defining a rate interval and being determined within said rate interval by
  a) Using a utility function for each CE being at least dependent on the CEMR and at least one parameter including a fairness parameter,
  b) Assigning an initial price for each CE, wherein said price is calculated as a difference between said maximum channel capacity and the number of messages received per time unit,
  c) Adjusting the CEMR of each CE taking into account received prices of said other CE, wherein each CE adjusts its own CEMR, such that the difference between the own utility function for the CEMR and the sum of received prices weighted with the own rate is maximized,
  d) Computing a new price for each CE based on difference between the initial price and available channel load for the respective CE,
  e) Check a termination condition for said difference and if not fulfilled, use said new price as initial price and perform steps c)-e) again until a termination condition is fulfilled.

In a further embodiment the present invention provides a communicating entity, 'CE', comprising a sender for sending messages to other neighboring CE with a communicating entity-dependent message rate, 'CEMR', and with an entity-dependent transmission power, and wherein said messages are transmitted via one or more channels having a maximum channel capacity, and wherein the CEMR are between a minimum and maximum rate defining a rate interval, a receiver for receiving messages, and a computing entity having a memory, wherein the following steps are performed in said memory of said CE
  a) Using a utility function being at least dependent on the CEMR and at least one parameter including a fairness parameter,
  b) Assigning an initial price, wherein said price is calculated as a difference between said maximum channel capacity and the number of messages received per time unit via said receiver,
  c) Adjusting the CEMR of said CE taking into account received prices of said other CE, wherein said CE adjusts its own CEMR, such that the difference between the own utility function for the CEMR and the sum of received prices weighted with the own rate is maximized,
  d) Computing a new price for the CE based on difference between the initial price and available channel load for the CE,
  e) Check a termination condition for said difference and if not fulfilled, use said new price as initial price for the CE and perform steps c)-e) again until a termination condition is fulfilled.

In a further embodiment the present invention provides a system for controlling messages between communicating entities, 'CE', performing cooperative inter-entity applications wherein each CE is adapted to send messages to and to receive messages from other neighboring CE with an communicating entity-dependent message rate, 'CEMR', and with an communicating entity-dependent transmission power, and wherein said messages are transmitted by the CE via one or more channels having a maximum channel capacity, and wherein the CEMR are between a minimum and maximum rate defining a rate interval and being determined within said rate interval and wherein each CE is adapted to
  a) Use a utility function being at least dependent on the CEMR and at least one parameter including a fairness parameter,
  b) Use an initial price, wherein said price is calculated as a difference between said maximum channel capacity and the number of messages received per time unit,
  c) Adjust its own CEMR taking into account received prices of said CE, such that the difference between the own utility function for the CEMR and the sum of received prices weighted with the own rate is maximized, d) Computing a new price based on difference between the initial price and available channel load seen by itself and to e) Check a termination condition for said difference and if not fulfilled, use said new price as initial price and perform steps c)-e) again until a termination condition is fulfilled.

Embodiments of the invention may have the following advantage: A realistic controlling of messages between communicating entities significantly outperforming conventional rate control and message control methods and systems.

Embodiments of the invention have further the advantage that convergence is arbitrarily quickly and requires less environmental information than conventional methods and systems. For example embodiments do not require two-hop information.

Embodiments of the invention have the advantage that a network utility maximization NUM can be used by formulating the control of the rate of messages as a NUM rate allocation problem enabled by the convexity and the possibility to use a projected subgradient procedure to its dual problem enabling a distributed implementation while being globally fair. The shape of the utility function maximized by the communicating entities, e.g. vehicles may be dependent on the fairness to be implemented, e.g. proportional fairness, weighted fairness and/or max-min-fairness which was disclosed.

The term "utility function" is to be understood as representation of a usage of at least part of a transmission channel capacity by a communicating entity.

The term "communicating entity" is to be understood in its broadest sense: For example a communicating entity may be any type of static or movable machine or device, wherein a movable machine or device can be manually or automatically moved, for example by an engine, wheels, etc. A communicating entity may be sensor device like a camera, etc., roadside equipment, etc. or in form of a moving object like a car, a bicycle, a bus, a truck, a flying object like an airplane, helicopter, drone, etc. as well as a ship, a boat, a train or the like.

The term "computing device" is to be understood in its broadest sense and may be any kind of device which can be used or is adapted to compute or perform methods, algorithms, programs like applications or the like and may comprise one or more processors having one or more cores and memory for storing.

The "message rate" is defined as the number of messages per time unit.

The term "transmission power" is to be understood as a power with which via a cable-based or via wireless channel a signal in which messages are encoded is transmitted.

The term "price" is to be understood in its broadest sense and means or refers to any kind of value, set of values or sum of values used for indication of congestion seen by a communicating entity.

Further features, advantages and further embodiments are described or may become apparent in the following:

Said available channel load may be estimated or may be determined based on at least one of: a channel business time, a number of correctly received messages, provided actual rates of CE by the CE. This enables a precise estimation of the real channel occupation since it depends on channel conditions and the respective collisions.

Said available channel load may be proportionally amended using a constant. If a constant is used, each price can be determined independently from others by observing the available bandwidth: The link or channel capacity minus the volume of traversing traffic. Therefore signaling is only needed just to inform the demands of all the prices of its traversed links, for example by using a real non-negative number per communicating entity.

Said constant may be multiplied with a sign of the available channel load. This enables the following: The sign function returns the sign either positive or negative of its argument, i.e. the available channel load. Then the price is increased in constant amount of said constant when the channel is congested and decreased in constant units, i.e. in units of said constant otherwise but never falling below zero.

A price may be broadcasted by including said price into a message. This enables in an efficient way to broadcast the prices of the different communicating entities. For example the price may be piggybacked in a beacon to inform the other vehicles about the actual CEMR.

The initial price for each CE may be based on the inverse of the maximum channel capacity. This enables an efficient, i.e. optimal choice for the initial price resulting in a minimum number of steps until the termination condition is fulfilled. Thus, efficiency is significantly enhanced.

Said termination condition may be fulfilled when a difference between a prior and an actual CEMR is below a certain threshold. This enables in an easy way to implement a termination condition.

Said termination condition may be fulfilled when the absolute value of said free available channel load is smaller than a product of a flapping parameter and a maximum channel load, wherein said flapping parameter is a function of a product of the maximum channel load and said constant. This enables an efficient convergence and convergence time of all steps a)-e) by minimizing the oscillations of flapping when computing the new prices.

Said new price may be projected into a non-negative price. This avoids non-valid prices during computing of a new price. Thus, efficiency and precision is enhanced.

Said adjusted CEMR is projected into said rate interval. By projecting an adjusted CEMR into the rate interval non-valid rates are avoided. Thus, efficiency is enhanced.

The utility function may use different functions with the argument of said CEMR being dependent on the value of said fairness parameter. This enhances the flexibility since different functions can be used as utility functions: For instance as utility function a linear function in the CEMR can be used if the fairness parameter is equal to zero, a constant multiplied with a logarithm of rate can be used if the fairness parameter is equal to one and further it may be proportional to the rate to the power of one minus the fairness parameter if the fairness parameter a is greater than zero. Thus, flexibility in terms of fairness is enhanced. Further an adaptation for realistic scenarios is enhanced.

Said messages may be provided in form of status messages of cooperative inter-object applications like beacons which are transmitted periodically. This enables an easy implementation in cooperative inter-object applications like vehicular networks or the like.

Said CE may be a vehicle like a car, bus, truck, train, aircraft of the like. This allows a flexible implementation in a variety of different communicating entities.

Figure 1:
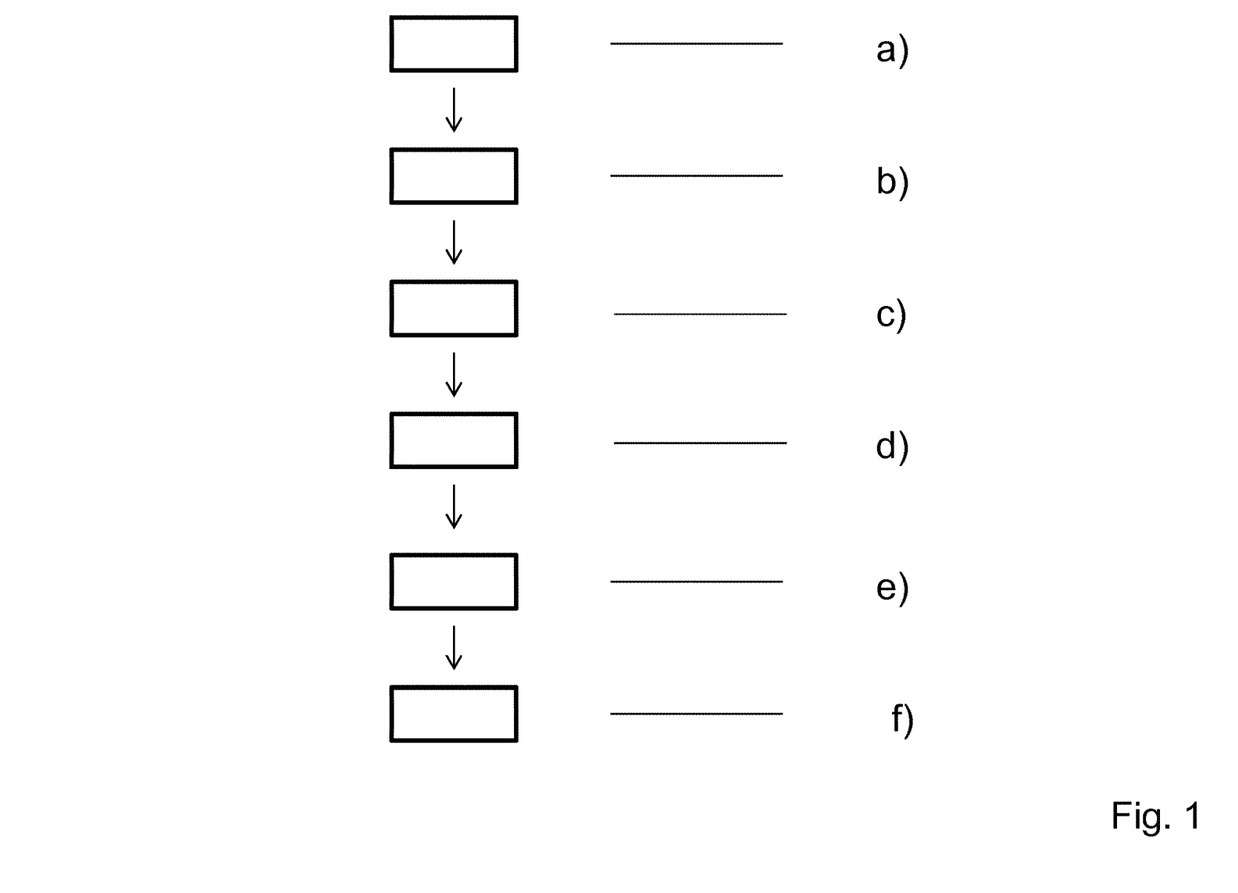
FIG. 1 shows steps of a method according to an embodiment of the present invention.

FIG. 1 shows steps of a method according to an embodiment of the present invention.

In FIG. 1 six steps of a method for controlling messages between communicating entities, 'CE', is shown, said communicating entities comprising computing devices, wherein said method is performed in a memory available to a computing device, and wherein each communicating entity sends messages to other neighboring communicating entities with a entity-dependent message rate, 'CEMR', and with an entity-dependent transmission power, and wherein said messages are transmitted via one or more channels having a maximum channel capacity, and wherein the CEMR are between a minimum and maximum rate defining a rate interval and being determined within said rate interval.

The first step a) is performed by using a utility function for each CE being at least dependent on the CEMR and at least one parameter including a fairness parameter.

The second step b) is performed by assigning an initial price for each CE, wherein said price is calculated as a difference between said maximum channel capacity and the number of messages received per time unit.

The third step b') is optional and is performed by broadcasting the initial price of each CE to the other CE.

The fourth step c) is performed by adjusting the CEMR of each CE taking into account received prices of said other CE, wherein each CE adjusts its own CEMR, such that the difference between the own utility function for the CEMR and the sum of received prices weighted with the own rate is maximized.

The fifth step d) is performed by computing a new price for each CE based on difference between the initial price and available channel load for the respective CE.

The sixth step e) is performed by checking a termination condition for said difference and if not fulfilled, using said new price as initial price and perform steps c)-e) again until a termination condition is fulfilled.

In more detail the basis for NUM modeling for rate allocation in packet switched networks is described in the following, e.g. shown in the non patent literature of Kelly, Frank, "Charging and rate control for elastic traffic." European transactions on Telecommunications 8.1 (1997): 33-37, and J. Mo and J. Walrand, "Fair end-to-end window-based congestion control," IEEE/ACM Transactions on Networking, vol. 8, no. 5, pp. 556-567, 2000 and in more detail in the non-patent literature of S. Boyd and L. Vandenberghe, Convex Optimization. Cambridge University Press, Cambridge, UK, 2004, D. P. Bertsekas and J. N. Tsitsiklis, Parallel and Distributed Computation: Numerical Methods. Prentice-Hall, Inc., Upper Saddle River, N J, 1989 and M. Chiang, S. H. Low, A. R. Calderbank, and J. C. Doyle, "Layering as optimization decomposition: A mathematical theory of network architectures," Proceedings of the IEEE, vol 95, no 1, pp. 255-312.

In the following a general description is provided.

Let G (N, E) be a packet switched network, being N the set of nodes and E the set of links. Let D be a set of traffic sources. For each traffic source d, $p_d$ denotes the known set of links traversed by the traffic of the source, and $r_d$ the unknown bandwidth to be allocated to d. D(e) is denoted as the subset of demands whose traffic traverses link e. Then the basic NUM modeling of the rate allocation problem is:

$$\max_{r_d} \sum_d U_d(r_d) \text{ subject to:} \tag{1a}$$

$$\sum_{d \in D(x)} r_d \leq u_x \forall_e \in E \tag{1b}$$

$$r_d \geq 0 \forall d \in D \tag{1c}$$

The objective function (1a) maximizes the sum of the utility functions $U_d$ of each source. Constraints (1b) mean that the sum of the traffic traversing a link e, should not exceed link capacity $u_e$. Finally, constraints (1c) prohibit assigning a negative amount of bandwidth to a source. Functions $U_d$ for each demand d are strictly increasing and strictly concave twice-differentiable functions of the rate $r_d$ of that demand. Being $U_d$ an increasing function means that sources always perceive more bandwidth as more useful, and are always willing to transmit more traffic if allowed.

Being concave means that a sort of diminishing returns effect occurs in rate allocation, i.e. increasing the bandwidth of a source from r to r+1 means a higher increase in utility, than increasing a unit of bandwidth from r+1 to r+2. The objective function (1a) is strictly concave, and problem (1) is a convex program with a unique optimum solution.

Several problem decomposition strategies may be applied and permit finding decentralized implementations of gradient-based algorithms with convergence guarantees to solve problem (1). In the following an approach based on a dual decomposition of the problem is described. First the Lagrangian function L of (1) relaxing the constraints (1b) is formed.

$$L(r, \pi) = -\sum_d U_d(r_d) + \sum_e \pi_e \left( u_e - \sum_{d \in D(e)} r_d \right) =$$

$$= \sum_d \left( U_d(r_d) - r_d \sum_e \pi_e \right) - \sum_e \pi_e u_e$$

where $\pi_e \geq 0$ are the Lagrange multipliers (link prices) associated with the relaxed constraints. The dual function $g(\pi)$ associated to this relaxation, is defined as:

$$g(\pi) = \max_{r_d \geq 0, d \in D} \{L(r, \pi)\} \tag{2}$$

That is, given a vector of link prices $\pi$, the dual function returns the optimal utility of a problem where link constraints are relaxed, and for each link e, a price $\pi_e$ per bandwidth unit is applied resulting in a virtual cost of using the links. Given a set of prices $\pi$, $r^*(\pi)$ is denoted to the maximizer of (2):

$$r_d^*(\pi) = \arg \max_{r_d \geq 0} \{L(r, \pi)\} = \max_{r_d \geq 0} \left\{ U_d(r_d) - r_d \sum_{e \in p_d} \pi_e \right\} \tag{3}$$

To compute the rate $r^*_d(\pi)$, each demand d needs to know just its own utility function $U_d$ and the set of prices $\pi_e$ for the traversed links. Since functions $U_d$ are strictly concave $r^*_d(\pi)$, rates are unique for each $\pi$. The dual problem of (1) consists of $f\pi$), r the set of prices $\pi \geq 0$ which minimizes $g(\pi)$:

$$\min_{\pi \geq 0} \{g(\pi)\} \tag{4}$$

Since the original problem is convex with linear constraints, it has the strong duality property as disclosed in the non-patent literature of S. Boyd and L. Vandenberghe, Convex Optimization. Cambridge University Press, Cambridge, UK, 2004, and the Karush-Kuhn-Tucker (KKT) conditions characterize its optimum solution. Then, it can be shown that if $T\pi^*$ are the link prices that solve the dual problem, then the rates $r^*(\pi^*)$ are the optimal solution of the original problem (1).

The conventional dual approach for solving the rate allocation problem consists of finding the dual optimal link prices π*, as a mean to (in parallel) obtain the optimum rate allocation r*. This is enabled by the following well-known property: The dual function g is a convex function of the prices π. A subgradient of g in π is given by $$s = \left(u_e - \sum_{d \in D(e)} r_d, e \in E\right)$$

wherein a subgradient is a generalization of the concept of gradient for non-differentiable convex functions. A subgradient s of a convex function f(x): S R in point $x_0 \in S$ is a vectors for which:

$$f(x) \geq f(x_0) + s(x - x_0) \forall x \in S$$

Since the objective function is strictly concave, g is differentiable, and the subgradient computed above is actually a gradient. A standard projected gradient algorithm variant to iteratively first the optimal link prices may be applied, and indirectly the optimal rates. The following procedure III. 1 sketches this:

---

Procedure III.1: DECENTRALIZED( )
main
Step 0. k = 0. Set feasible initial link prices $\pi_e \geq 0$
e.g. $\pi^0_e = 1 \ \forall e \in E$.
Step 1. Each demand d is signaled the prices of traversed links $\pi^k_e \ e \in p_d$.
Step 2. Each link computes $\pi^{k+1}_e$ according to:

$$\pi^{k+1}_e = \left[\pi^k_e - \beta^k_e\left(u_e - \sum_{d \in D(e)} r_d\right)\right]_0$$

Go to step 1.

---

In step 1 of the procedure, each demand allocates the rate that solves the dual function g(π), with the only knowledge of the prices of the traversed links. For instance, if $U_d(r_d) = \log r_d$ then:

$$r^k_d(\pi^k) = \arg\max_{r_d \geq 0}\left\{\log r_d - \sum_{e \in P_d} \pi^k_e\right\} = \frac{1}{\sum_{e \in P_d} \pi^k_e}$$

In step 2 the prices are updated moving in the direction of the negative gradient of the dual function, since minimum has to be found. The obtained solution is projected into the set of valid prices π≥0. This projection is conducted by operator $[x]_0$ which resets with 0 the negative values, and leaves positive values unchanged.

$$[x]_0 = \begin{cases} x & \text{if } x \geq 0 \\ 0 & \text{if } x < 0 \end{cases}$$

Several values can be chosen for the $\beta^k_e$ coefficients that e.g. guarantee convergence to the optimum allocation. For instance, convergence is guaranteed for decreasing $\beta^k(\beta^k_e = \beta^k, \forall e)$ such that $\beta^k \to 0$ and $\Sigma_k = \infty$ i.e. $\beta^k = 1/k$. Also, constant values $\beta^k = \beta$ may guarantee convergence to the optimum for β sufficiently small. Different conventional gradient algorithms appearing in the literature could be used, inheriting their convergence guarantees as disclosed in the non patent literature of S. Boyd and L. Vandenberghe, Convex Optimization. Cambridge University Press, Cambridge, UK, 2004 and D. P. Bertsekas and J. N. Tsitsiklis, Parallel and Distributed Computation: Numerical Methods. Prentice-Hall, Inc., Upper Saddle River, N J, 1989. In the rate allocation problem context, in gradient procedure variants for which the procedure III.1 can be solved in a decentralized form may be used: For instance, if a constant β coefficient is used, each link can compute its gradient coordinate independently from others, by observing the available bandwidth: the link capacity minus the volume of traversing traffic. Therefore signaling is needed just to inform the demands about the prices of its traversed links: one real non-negative number per link.

As in every resource allocation problem, the optimum rate allocation in a network should balance two competing efforts: maximizing the total network throughput ($\Sigma_d r_d$), but in a fair manner. In this context, fair means avoiding those allocations where some demands are granted a high amount of bandwidth, while others suffer starvation.

Said fairness has been defined in a number of different ways. One of the most common fairness notions is max-min fairness. A rate allocation r is said to be max-min fair if the rate of any demand $d_1$ cannot be increased without decreasing the rate of some other demand $d_2$ which in r received less bandwidth ($r_{d2} \geq r_{d1}$). A vector r* is proportionally fair if for any other feasible rate allocation r, the aggregate of the proportional change of r respect to r* is negative:

$$\sum_d \frac{r_d - r^*_d}{r^*_d} \leq 0, \ \forall \ r \text{ feasible}$$

That is, the percentages of increases/decreases respect to any other allocation should sum negative. In the non-patent literature of J. Mo and J. Walrand, "Fair end-to-end window-based congestion control," IEEE/ACM Transactions on Networking, vol. 8, no. 5, pp. 556-567, 2000 the notion of proportional fairness has been extended. Let $w=(w_d, w \in D)$ be a vector of positive weight coefficients, α≥0. A rate allocation r* is said to be (α, w)-proportionally fair if for any other feasible allocation r it holds that:

$$\sum_d w_d \frac{r_d - r^*_d}{r^{*\alpha}_d} \leq 0, \ \forall \ r \text{ feasible}$$

The $w_d$ values can be used to give more importance to the rates allocated to some demands. If all demands are equal for the system ($w_d=1, \forall d \in D$), conventional fairness notions are produced for some a values. In particular, 0-proportional fair solutions (α=0) are those which maximize the throughput $\Sigma_d r_d$. Actually, these solutions can be arbitrarily unfair, granting all the link bandwidth to some demands, and zero to others. If α=1 proportional fairness is achieved. In addition, it can be shown that max-min fairness solutions are obtained when α→00 e.g. disclosed in the non-patent literature of J. Mo and J. Walrand, "Fair end-to-end window-based congestion control," IEEE/ACM Transactions on Networking, vol. 8, no. 5, pp. 556-567, 2000.

There is no consensus on which particular value of a is best suited for being "fair enough" in the rate allocation context. Actually, this decision is clearly application dependent. Lower values of α tend to produce solutions where the amount of traffic carried $\Sigma_d\ r_d$ is higher, but with larger differences between the rates allocated to different demands (more "unfair"). In its turn, higher α values reduce the difference between demands, commonly at a cost of a lower aggregated throughput.

The importance of the previous definition of fairness, is that if appropriate utility functions $U_d$ are used, the optimum solutions of NUM rate allocation problems, are also (w, α)-fair as presented in the non-patent literature of J. Mo and J. Walrand, "Fair end-to-end window-based congestion control," IEEE/ACM Transactions on Networking, vol. 8, no. 5, pp. 556-567, 2000, for the basic NUM rate allocation problem (1).

This concept is now extended, i.e. is applied to a much wider set of problems. When the generalized NUM problem for resource allocation, with decision variables (r, y). Vector $r=\{r_d, d \in D\}$ represent the rates (or in general resources) to assign to the demands, while y represent any arbitrary set of auxiliary variables, the resource allocation problem may be defined as:

$$\max \sum_d U(r_d) \text{ subject to } (r, y) \in X \quad (5)$$

here X is an arbitrary non-empty, closed, convex set. Let the utility functions in (5) be:

$$U_d(r_d) = \begin{cases} w_d r_d & \text{if } \alpha = 0 \\ w_d \log r_d & \text{if } \alpha = 1 \\ w_d \dfrac{r_d^{1-\alpha}}{1-\alpha} & \text{if } \alpha > 0, \alpha \neq 1 \end{cases} \quad (6)$$

Then, it holds that a resource allocation (r, y) is (α,w)-proportionally fair if, and only if, it is the optimum solution of (5).

The proof is based on a conventional optimality condition in convex optimization that states that given X a non-empty, closed and convex set, and F a convex function in X, a vector $x^* \in X$ is an optimal solution of the problem $\min_{x \in X} F(x)$ if and only if, $(x-x^*)' \nabla F(x^*) \geq 0$ for every $x \in X$. Applying this property to problem (5) a solution $(r^*, y^*)$ optimal to the problem (5) is obtained if and only if:

$$\sum_d w_d \frac{r_d - r_d^*}{r_d^{*\alpha}} \geq 0, \forall\ (r, y) \in X$$

which coincides with the definition of a solution $(r^*, y^*)$ being (w, α)-fair. ∎

In the following the above mentioned principles are now applied in vehicular networks according to an embodiment of the invention: Let V be a set of vehicles in a vehicular network. Each vehicle $v \in V$ sends beacons at a rate $r_v$, beacons/sec, with a fixed transmission power. Beacons propagate and are received by other vehicles, which we call neighbor vehicles. Let n(v) denote the neighbor vehicles of v, which includes v. The total rate received by each vehicle is the sum of the rates of their neighbors and this amount should be limited to a maximum C, that is, a Maximum Beaconing Load (MBL), to avoid channel congestion.

The NUM version of the beaconing rate allocation problem is given by:

$$\max_{r_v} \sum_v U_v(r_v) \text{ subject to:} \quad (7a)$$

$$\sum_{v \in n(v)} r_v \leq C\ \forall\ v \in V \quad (7b)$$

$$R_{min} \leq r_v \leq R_{max}\ \forall\ v \in V \quad (7c)$$

The objective function (7a) is the sum of the utility $U_v(r_v)$ for each vehicle, which depends on the rate $r_v$, allocated to it. Vehicle utility functions are chosen to be the ones in (6), so that the fairness in the rate allocation to the vehicles is governed by the α factor selected. Constraints (7b) means that any vehicle has to find the channel busy a give fraction (MBL) of the total time. Since the channel is sensed as busy when it is occupied by the traffic sent by the neighboring vehicles and its own traffic, the sum $\Sigma_{v \in n}(v)\ r_v$ must be below the MBL (C). Finally, constraints (7c) force the vehicle rates to be within a minimum ($R_{min}$) and maximum ($R_{max}$) value.

Taking into account the above comments a rate allocation to the vehicles is α-fair if and only if, it is the optimum solution of (7). Applying the procedure III.I to the beaconing rate problem, a decentralized control with guaranteed properties of convergence to the optimal α-fair solution is achieved. In the procedure IV.I this procedure is sketched for the case of proportional fairness ($U(r_v)=\log r_v$), and constant β value.

---

Procedere IV.1: PROPORTIONAL( )

main
  Step 0. K = 0, initial vehicle prices $\pi_v = 1$
  Step 1. Each vehicle v receive the prices of
    neighbor vehicles $\pi_{v'}^k$, $v' \in n(v)$.

Then: $r_v^k = \left[ \dfrac{1}{\sum_{v' \in n(v)} \pi_{v'}} \right]_{R_{min}}^{R_{max}}$   Step 2. Each vehicle computes $\pi_v^{k+1}$ according to:

$\pi_v^{k+1} = \left[ \pi_v^k - \beta \left( C - \sum_{v' \in n(v)} r_{v'} \right) \right]_0$   Go to step 1.

---

The procedure IV.1 requires each vehicle v to store a non-negative real number, its $$\frac{1}{\sum_{v' \in n(v)} \pi_{v'}}$$

price $\pi_v$, calculated as the difference between channel capacity C, and the number of beacons received. The difference between channel capacity and the real fraction used can be obtained in several ways, either by monitoring the channel, that is, measuring the Channel Busy Time (CBT), or by counting the number of correctly received beacons. In both cases, the result is an estimate of the real channel occupation, since it depends on channel conditions and collisions. Another possibility is to let vehicles inform others of their actual rate by piggybacking it in the beacon, which is used in the following: Periodically, each vehicle broadcasts its price $\pi_v$, i.e., piggybacked in a beacon. In parallel, each vehicle v receives and stores the prices $\pi_{v'}$ from their neighboring vehicles n(v): the set of vehicles from which it receives beacons. Finally, it periodically updates its beaconing rate $r_v$ according to the rule (3). Note that in this update, the value projected into the $R_{min}$, $R_{max}$ interval.

Another embodiment is described in the following.

The procedure IV.1 described previously is an example of decentralized scheme for producing α-fair allocations in vehicle networks. A variation of this scheme is described, where the weights of the links (Step 2) are updated in a different form:

---
Procedure IV.2: FABRIC ( )
---
main
  Step 0. K = 0, initial vehicle prices $\pi_v = 1$
  Step 1. Each vehicle v receive the prices of
    neighbor vehicles
    $$r_v^k = \left[\frac{1}{\sum_{v' \in n(v)} \pi_{v'}}\right]_{R_{min}}^{R_{max}}$$
  Step 2. Each vehicle computes $\pi_v^{k+1}$ according to:
    $$\pi_v^{k+1} = \left[\pi_v^k - \beta \operatorname{sign}\left(C - \sum_{v' \in n(v)} r_{v'}\right)\right]_0$$
  Go to step 1.
--- where sign(x) returns the sign (positive or negative) of the argument. That is, in this case the vehicle price is increased in a constants amount β of units when the channel is congested and decreased in β units otherwise, but never falling below zero.

Figure 2:
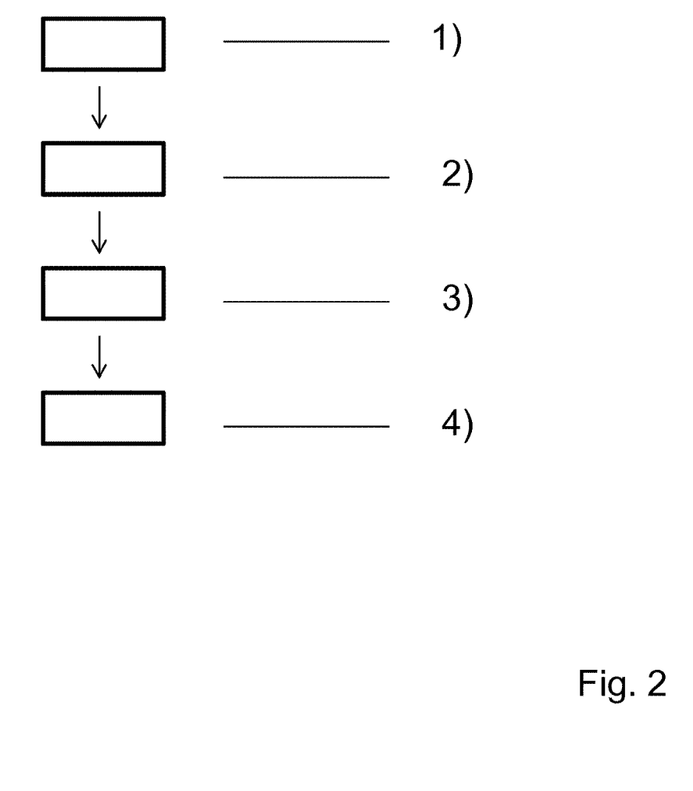
FIG. 2 shows steps of a method according to a further embodiment of the present invention.

FIG. 2 shows steps of a method according to a further embodiment of the present invention.

In FIG. 2 a method for controlling the rate of beacon messages in a vehicular network is shown comprising the following steps:
1) setting initial link prices;
2) exchanging information about the prices of neighboring vehicles;
3) setting ego vehicle's rate for the next step by using an NUM method to cast a beaconing rate allocation problem and by taking into account information about the prices of neighboring vehicles; and
4) repeating in parallel on all vehicles.

Figure 3:
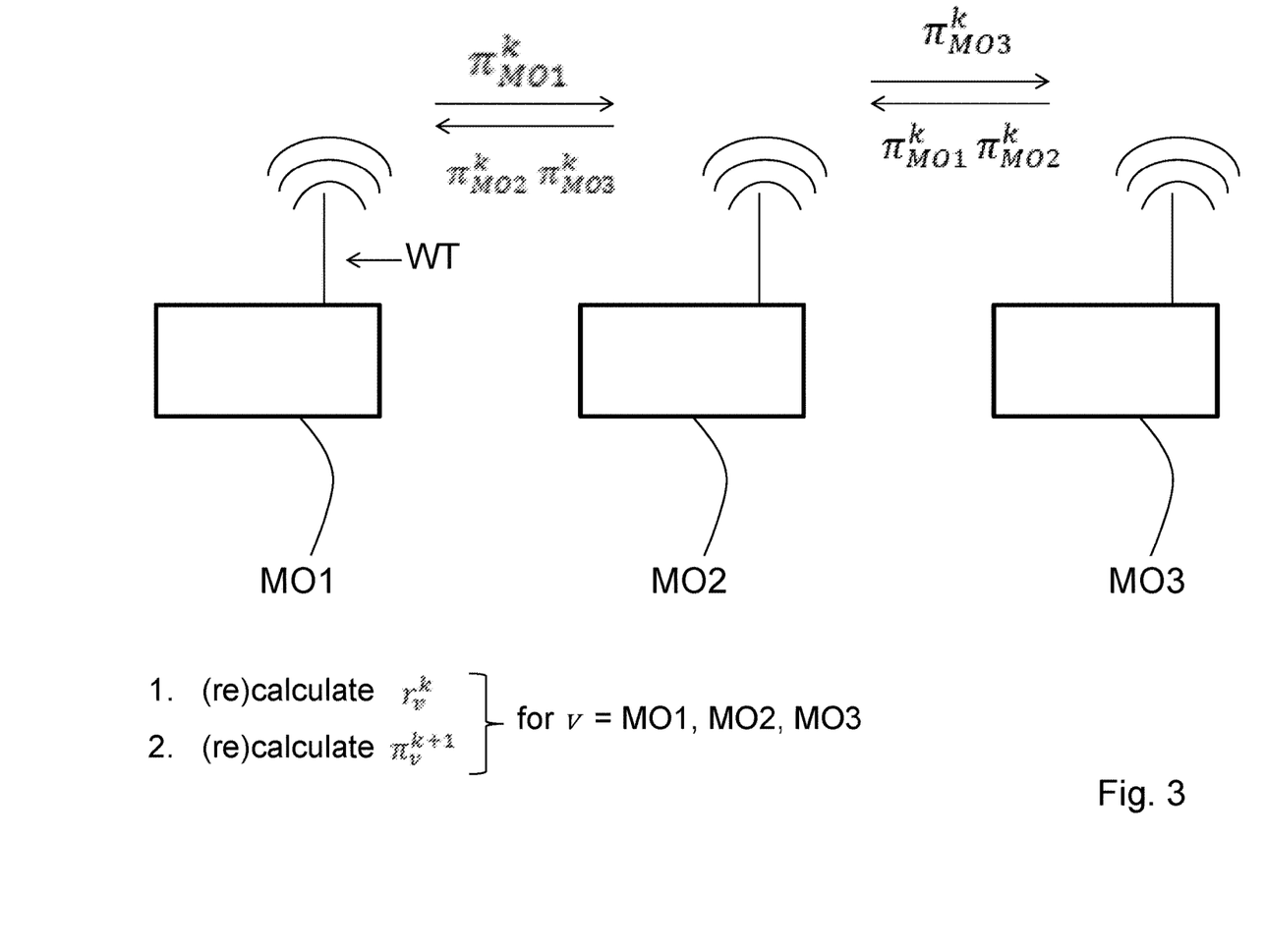
FIG. 3 shows a system according to a further embodiment of the present invention.

FIG. 3 shows a system according to a further embodiment of the present invention.

In FIG. 3, three communicating entities CE1, CE2 and CE3 are shown. Each CE1, CE2 and CE3 is equipped with a wireless transponder WT for sending and receiving prices, in detail for sending its own price $\pi_v^k$ and receiving prices of other vehicles $\pi_{v'}^k$.

The communicating entities CE1, CE2 and CE3 perform for example network utility maximization by performing procedure IV.1 or performing procedure IV.2 as shown above.

FIG. 4 shows a diagram showing beacon rates over time obtained according to a further embodiment of the present mentioned and compared with a conventional method.

In FIG. 4 a selected beaconing rate in a one-hop scenario for FABRIC and LIMERIC with 100 and 200 vehicles and different price steps β and flapping parameters is shown. The LIMERIC parameters have been set to $\alpha_L = 0.01$ and $$\beta_L = \frac{1}{150}.$$

Optimal values are shown with a straight line.

In the following the validity of an embodiment and assumptions are shown. For the validation a scenario is simulated, where vehicles do not move and so the vehicle density and position can be controlled accurately.

In at least one embodiment the present invention provides a control scheme aimed at solving a general congestion problem by beaconing rate adjustment and modeling it as a network utility maximization rate allocation problem. The beaconing rate allocation problem is modeled as network utility maximization NUM enabling to design a broad family of decentralized and efficient methods with proved convergence guaranteeing a fair location solution wherein the convergence is enabled by the convexity of the network utility maximization problem and a possibility to solve it by applying a projected subgradient procedure to its dual problem, which permits a distributed implementation.

In at least one embodiment the present invention takes into account the unique characteristics of vehicular embodiment which is decentralized, lossy and rapidly changing within the information locally available in said vehicular networks, for example information from direct neighbors about channel load to set up a network utility maximization optimization problem and near-optionally assign appropriate beaconing rates for each vehicle in a distributed manor.

At least one embodiment of the present invention provides a method for rate control and/or a location e.g. in vehicular network environment that
  a) uses information about the price (congestion level) from neighboring vehicles or in general communicating entities to form a Network Utility Maximization optimization problem;
  b) employs a projected subgradient algorithm to arrive at a fair and bandwidth efficient rate allocation in a distributed way;
  c) introduces the concept of utility function of each vehicle, and relates the particular shape of the utility function of the vehicles with the type of fairness induced globally;
  d) employs the flapping parameter to minimize the oscillation of the rate; and
  e) generalizes and formally defines the notion of fairness of a beacon rate allocation in vehicular networks.

At least one embodiment of the present invention enables a realistic simulation, which performs better than existing conventional algorithms, procedures, methods and systems
  specifically, it significantly outperformed a rate control algorithm that is proposed to be used by both ETSI and C2C-CC
requiring less environmental information than conventional algorithms, procedures, methods and systems
  specifically, it was shown to perform as well or better than methods requiring two-hop information by using one-hop information only
convergence arbitrarily quickly, depending on the granularity of the used time step.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A method for controlling messages between communicating entities (CE) including computing devices, the method being performed in a memory available to a computing device; each CE sending messages to other neighboring CE with a communicating entity-dependent message rate (CEMR), and with a communicating entity-dependent transmission power; the messages being transmitted via one or more channels having a maximum channel capacity; and the CEMR defining a rate interval between a minimum and maximum rate, the method comprising:
   determining the CEMR within the rate interval by employing a combination of three or more of the following, including at least steps c)-e):
   a) using a utility function for each CE being at least dependent on the CEMR and at least one parameter including a fairness parameter;
   b) assigning an initial price for each CE, wherein the price is calculated as a difference between the maximum channel capacity and the number of messages received per time unit;
   c) adjusting the CEMR of each CE taking into account received prices of the other CE, wherein each CE adjusts its own CEMR, such that the difference between the own utility function for the CEMR and the sum of received prices weighted with the own rate is maximized;
   d) computing a new price for each CE based on a difference between the initial price and an available channel load for the respective CE, wherein the available channel load is estimated or determined based on at least one of channel busy time, number of correctly received messages, and provided actual rates of CE by the CE, and is proportionally amended using a constant, the constant being multiplied with a sign of the available channel load of the respective CE; and
   e) checking a termination condition for the difference and, based on the termination condition being not fulfilled, using the new price as the initial price and performing steps c)-e) again until the termination condition is fulfilled.

2. The method of claim 1, wherein at least the channel busy time is used to estimate or determine the available channel load.

3. The method of claim 1, wherein each of steps a)-e) are performed.

4. The method of claim 1, wherein a price is broadcasted by including the price into a message.

5. The method of claim 1, wherein the initial price for each CE is based on an inverse of the maximum channel capacity.

6. The method of claim 1, wherein the termination condition is fulfilled when a difference between a prior and an actual CEMR is below a certain threshold.

7. The method of claim 1, wherein the termination condition is determined to be fulfilled based on an absolute value of the available channel load being smaller than a product of a flapping parameter and a maximum channel load, the flapping parameter being a function of a product of the maximum channel load and the constant.

8. The method of claim 1, wherein the new price is projected into a non-negative price.

9. The method of claim 1, wherein an adjusted CEMR is projected into the rate interval.

10. The method of claim 1, wherein the utility function uses different functions with an argument of the CEMR being dependent on a fairness parameter value.

11. The method of claim 1, wherein the messages are provided in form of status messages of cooperative inter-object applications like beacons which are transmitted periodically.

12. A communicating entity (CE), comprising:
   a sender for sending messages to other neighboring CE with a communicating entity-dependent message rate (CEMR), and with an communicating entity-dependent transmission power; the messages being transmitted via one or more channels having a maximum channel capacity; and the CEMR defining a rate interval between a minimum and maximum rate;
   a receiver for receiving messages; and
   a computing entity having a memory,
   wherein the following steps are performed by the computing entity using the memory of the communicating entity:
   a) using a utility function being at least dependent on the CEMR and at least one parameter including a fairness parameter;
   b) assigning an initial price, wherein the price is calculated as a difference between the maximum channel capacity and the number of messages received per time unit via the receiver;
   c) adjusting the CEMR of the CE taking into account received prices of the other CE, wherein the CE adjusts its own CEMR, such that the difference between the own utility function for the CEMR and the sum of received prices weighted with the own rate is maximized;
   d) computing a new price for the CE based on a difference between the initial price and an available channel load for the CE, wherein the available channel load is estimated or determined based on at least one of channel busy time, number of correctly received messages, and provided actual rates of CE by the CE, and is proportionally amended using a constant, the constant being multiplied with a sign of the available channel load of the respective CE; and e) checking a termination condition for the difference and, based on the termination condition being not fulfilled, using the new price as the initial price for the CE and performing steps c)-e) again until the termination condition is fulfilled.

13. A system for controlling messages between communicating entities, performing cooperative inter-entity applications, the system comprising:

more than one communicating entity (CE);

wherein each CE is adapted to send messages to, and to receive messages from other neighboring communicating entities with an entity-dependent message rate (CEMR), and with an entity-dependent transmission power; and the messages being transmitted by the CE via one or more channels having a maximum channel capacity; and the CEMR defining a rate interval between a minimum and maximum rate and being determined within the rate interval, and wherein each CE is configured to:

a) use a utility function being at least dependent on the CEMR and at least one parameter including a fairness parameter;

b) use an initial price, wherein the price is calculated as a difference between the maximum channel capacity and the number of messages received per time unit;

c) adjust its own CEMR taking into account received prices of the CE, such that the difference between the own utility function for the CEMR and the sum of received prices weighted with the own rate is maximized;

d) compute a new price based on a difference between the initial price and an available channel load seen by itself, wherein the available channel load is estimated or determined based on at least one of channel busy time, number of correctly received messages, and provided actual rates of CE by the CE, and is proportionally amended using a constant, the constant being multiplied with a sign of the available channel load of the respective CE; and e) check a termination condition for the difference and, based on the termination condition being not fulfilled, using the new price as the initial price and performing steps c)-e) again until the termination condition is fulfilled.

14. The CE of claim 12, in the form of a vehicle.

15. The CE of claim 12, in the form of a car, bus, truck, train, or aircraft.

* * * * *